(12) United States Patent
Arita et al.

(10) Patent No.: US 6,407,661 B2
(45) Date of Patent: Jun. 18, 2002

(54) APPARATUS AND METHOD FOR ALARMING DECREASE IN TIRE AIR-PRESSURE

(75) Inventors: Masakazu Arita; Minao Yanase, both of Kobe (JP)

(73) Assignees: Sumitomo Rubber Industries, Ltd., Hyogo-ken; Sumitomo Electric Industries, Ltd., Osaka-fu, both of (JP)

(*) Notice: Subject to any disclaimer, the term of this patent is extended or adjusted under 35 U.S.C. 154(b) by 0 days.

(21) Appl. No.: 09/832,194

(22) Filed: Apr. 11, 2001

(30) Foreign Application Priority Data

Apr. 11, 2000 (JP) ........................................ 2000-109524

(51) Int. Cl.$^7$ .............................................. B60C 23/00
(52) U.S. Cl. ...................... 340/444; 340/445; 73/146.2; 701/36; 702/98; 702/138; 702/142
(58) Field of Search ................................ 340/442, 444, 340/448, 445; 701/36; 702/98, 138, 96, 140, 142; 73/146.2

(56) References Cited

U.S. PATENT DOCUMENTS 5,569,848 A * 10/1996 Sharp ......................... 340/444
5,753,809 A * 5/1998 Ogusu et al. ................ 340/442
5,826,207 A * 10/1998 Ohashi et al. ............... 340/444
6,055,488 A * 4/2000 Nakajima .................... 702/97

* cited by examiner

Primary Examiner—Daniel J. Wu
(74) Attorney, Agent, or Firm—Birch, Stewart, Kolasch & Birch, LLP

(57) ABSTRACT

An apparatus for alarming decrease in tire air-pressure which alarms decrease of internal pressure of a tire on the basis of a rotational information obtained by tires attached to a four-wheeled vehicle. The apparatus comprises rotational information detecting means; memory means for storing the rotational information; calculation processing means for calculating a reciprocal number of a turning radius and calculating a judged value; first judging means for comparing the judged value with a reference value at every regions of the turning radius; and second judging means for canceling a judgement of decrease of internal pressure when a difference between the judged values in the right and left turning regions is different from a difference between reference judged values in the right and left turning regions which are obtained at a time of initializing run.

2 Claims, 9 Drawing Sheets

APPARATUS AND METHOD FOR ALARMING DECREASE IN TIRE AIR-PRESSURE

BACKGROUND OF THE INVENTION

The present invention relates to an apparatus and method for alarming decrease in tire air-pressure. In particular, the present invention relates to an apparatus and method for alarming decrease in tire air-pressure which can suitably judge decrease in an internal pressure of a tire in a vehicle mounting a limited slip differential device (LSD) thereon so as to securely prevent an erroneous alarm from being issued.

Conventionally, there has been known a matter that a dynamic load radius of the tire becomes small and a rotational speed becomes faster in comparison with a tire having a normal pneumatic pressure when a pneumatic pressure of the tire is decreased. For example, in Japanese Unexamined Patent Publication No. 149119/1995, there has been proposed a method of detecting decrease in internal pressure on the basis of a relative difference of number of revolution of the tire. Further, since the rotational speed of the tire is influenced by turning, speed acceleration and deceleration, load, speed of a vehicle and the like, various devices are considered in order to remove the influences.

However, among the vehicle in recent years, in order to improve a running performance such as cornering performance, there is a vehicle in which a limited slip differential device is mounted in a differential gear of a driving shaft. The limited slip differential device is so arranged that a differential operation is limited until a differential torque is over a set value in view of its mechanism, and the right and left driving wheels are rotated at a uniform speed. Accordingly, since an influence of decrease in a pneumatic pressure is not reflected to the number of revolution, it is impossible to detect the pressure decrease by a relative comparison of the number of revolution.

Judged values (DEL values) are collected on a portion having a relation of horizontal axis =0, that is, a vertical axis (Y axis) while the differential operation is limited regardless of an existence of the pressure decrease and a position, when a pressure of a tire in a rear right tire RR or a front left tire FL is decreased and a pressure of a tire in a rear left tire RL or a front right tire FR is decreased as shown in FIG. 8 in which a reciprocal number 1/R of a turning radius R calculated from the driving shaft is set to a horizontal axis (X axis). Accordingly, the applicant of the present application has found that the pressure decrease can be easily judged by comparing the judged value in a horizontal portion a little apart from the vertical axis (refer to Japanese Unexamined Patent Publication No. 123911/1999). Therefore, the arrangement is made such that when a difference A or B between the judged value at a time of pressure decrease and the DEL value of the normal pneumatic pressure is over a certain range, it is judged that the pneumatic pressure of the certain tire is decreased, whereby an alarm is issued.

However, in a clutch plate type LSD or the like, there is a case that the limited slip differential torque is changed with the passage of time. For example, in the case where the limited slip differential torque is decreased (DTD) or increased (DTU) as shown in FIG. 9 in comparison with a time of setting the pneumatic pressure of the tire to the normal pneumatic pressure and initializing a pneumatic pressure alarm apparatus (at a normal time), there is a risk that the DEL value is changed even when the pneumatic pressure of the tire is normal, and an erroneous alarm is issued in case the difference DTD or DTU with respect to the DEL value of the normal pneumatic pressure DS becomes equal to or more than a certain range.

The present invention is made in view of the above circumstances, and an object there of is to provide an apparatus and method for alarming decrease in tire air-pressure which can suitably judge decrease in an internal pressure of a tire in a vehicle mounting a limited slip differential device (LSD) thereon so as to securely prevent an erroneous alarm from being generated.

SUMMARY OF THE INVENTION

In accordance with the present invention, there is provided an apparatus for alarming decrease in tire air-pressure which alarms decrease of internal pressure of a tire on the basis of a rotational information obtained by tires attached to a four-wheeled vehicle, comprising:

rotational information detecting means for detecting a rotational information of each of the tires;

memory means for storing the rotational information of each of the tires;

calculation processing means for calculating a reciprocal number of a turning radius from the rotational information of the tire attached to a driving shaft among the rotational information of the respective tires and calculating a judged value from the rotational information of the respective tires;

first judging means for comparing the judged value with a reference value at every regions of the turning radius on the basis of a relation between the reciprocal number of the turning radius and the judged valve so as to judge decrease in internal pressure; and second judging means for canceling a judgement of decrease of internal pressure when a difference between the judged value in the right turning region and the judged value in the left turning region is different from a difference between a reference judged value in the right turning region and a reference judged value in the left turning region which are obtained at a time of initializing run.

Further, in accordance with the present invention, there is provided a method for alarming decrease in tire air-pressure which alarms decrease of internal pressure of a tire on the basis of a rotational information obtained by tires attached to a four-wheeled vehicle, comprising the steps of:

comparing a judged value with a reference value at every regions of a turning radius so as to judge decrease in internal pressure on the basis of a relation between a reciprocal number of the turning radius calculated from the rotational information of a tire attached to a driving shaft in the four-wheeled vehicle and a judged value calculated from the rotational information of the tires attached to the four-wheeled vehicle; and canceling a judgement of decrease in internal pressure when a difference between the judged value in the right turning region and the judged value in the left turning region is different from a difference between a reference judged value in the right turning region and a reference judged value in the left turning region which are obtained at a time of initializing run.

DETAILED DESCRIPTION

Hereinbelow, there is explained an apparatus and method for alarming decrease in tire air-pressure of the present invention with reference to the accompanying drawings.

Figure 1:
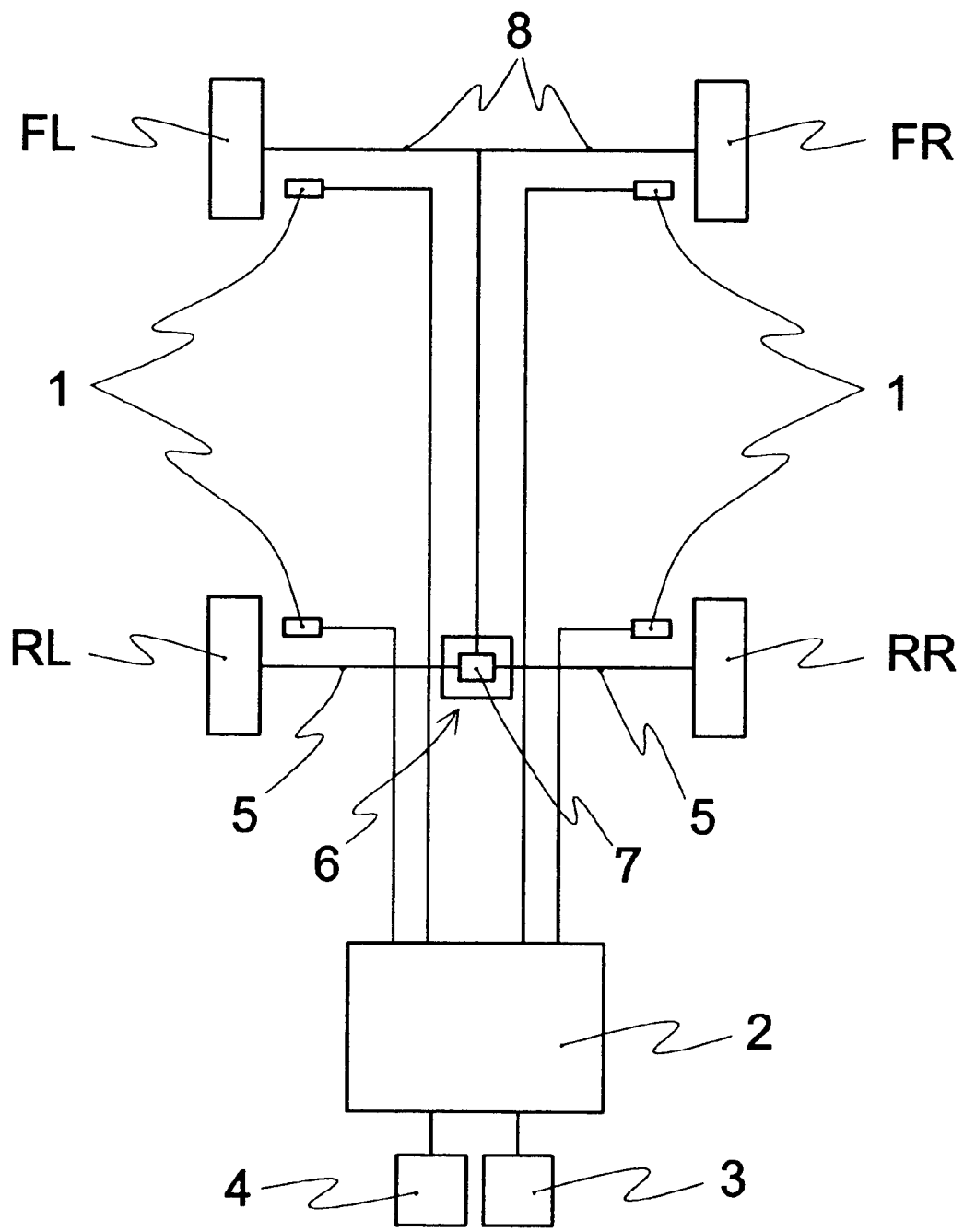
FIG. 1 is a block diagram showing one embodiment of an apparatus for alarming decrease in tire air-pressure of the present invention.

As shown in FIG. 1, an apparatus for alarming decrease in tire air-pressure is so designed as to detect whether or not pneumatic pressures of four tires FL, FR, RL and RR attached to a four-wheeled vehicle are decreased, and is provided with popular wheel speed sensors 1 respectively provided in connection with the tires FL, FR, RL and RR. The wheel speed sensor 1 detects a rotational information, for example, number of revolution, rotational speed, angular velocity or the like of each of the tires. Further, an output of the wheel speed sensor 1 is applied to a control unit 2. To the control unit 2, a display device 3 for informing of the tire FL, FR, RL and RR having a decreased pneumatic pressure, the display device 3 being constituted by a liquid crystal display element, a plasma display element, a CRT or the like, and an initializing switch 4 capable of being operated by a driver or the like are connected. Further, a limited slip differential device 7 is mounted on a differential gear 6 of a driving shaft 5. In this case, reference numeral 8 denotes a following shaft.

Figure 2:
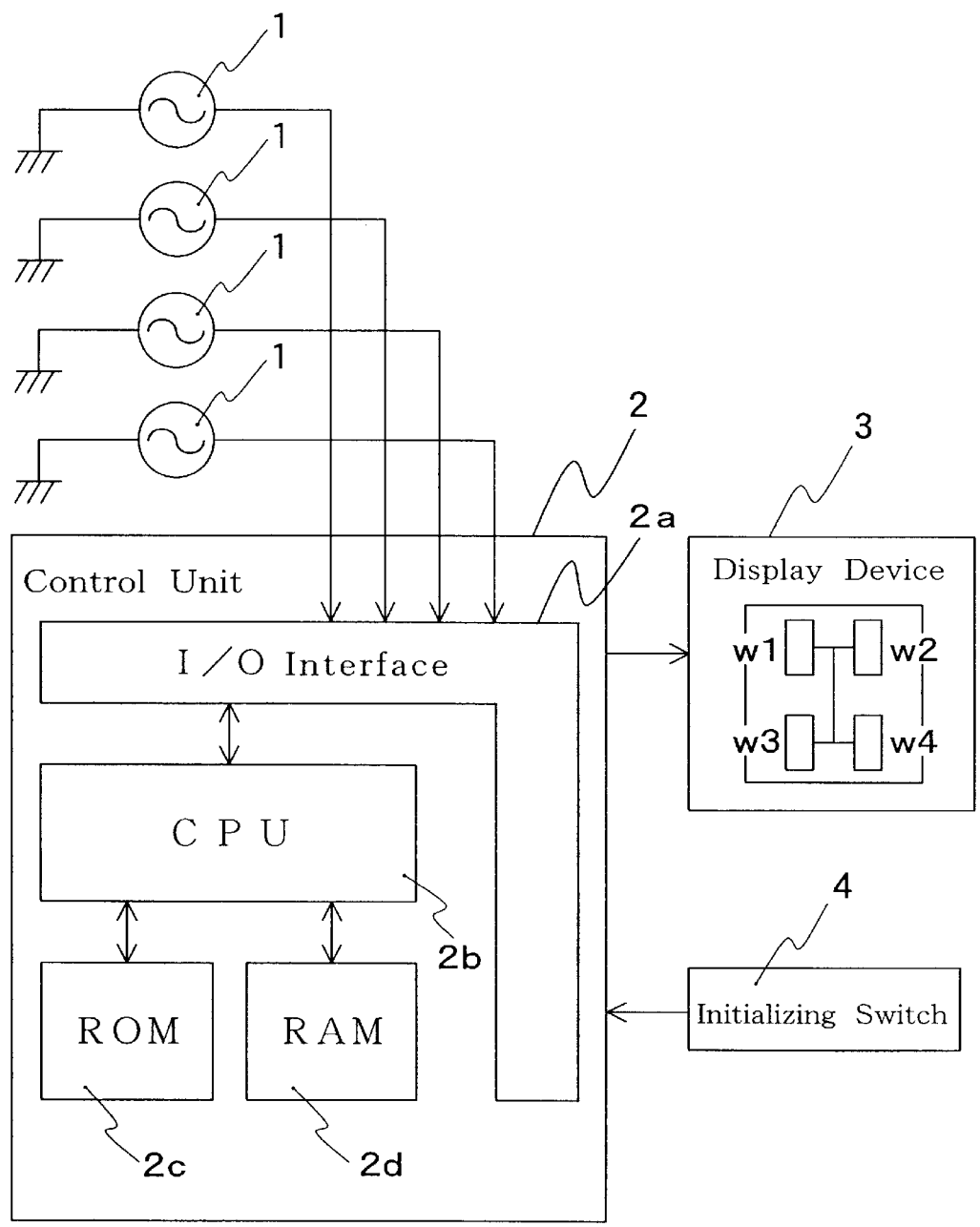
FIG. 2 is a block diagram showing an electric arrangement of an apparatus for alarming decrease in tire air-pressure shown in FIG. 1.

The control unit 2 includes, as shown in FIG. 2, an I/O interface 2a required for giving and taking a signal with respect to an external device, a CPU 2b functioning as a center of a calculating process, a ROM 2c storing a control operation program of the CPU 2b and a RAM 2d in which data is temporarily written or the written data is read at a time when the CPU 2b executes the control operation.

In the present invention, there are provided rotational information detecting means, memory means, calculation processing means, first judging means and second judging means.

The memory means stores a rotational information of each of the tires detected by the rotational information detecting means, and the calculation processing means respectively calculates a reciprocal number of a turning radius from the rotational information of the tire attached to the driving shaft among the respective tire rotational information and calculates a judged value from the rotational information of the respective tires. Then, the first judging means compares the judged value with the reference value at every regions of the turning radius so as to judge decrease in internal pressure, on the basis of a relation between the reciprocal number of the turning radius and the judged value.

However, in the case where the limited slip differential torque of the LSD mounted on the vehicle changes with the passage of time, there is a risk that an erroneous alarm is issued even when the pneumatic pressure of the tire is normal. Therefore, in accordance with the present invention, the apparatus is characterized that it includes second judging means for canceling the judgement of decrease in internal pressure when absolute values of the respective judged values are substantially equal to each other between a right turning region and a left turning region of a vehicle running, thereby preventing the erroneous alarm from being issued.

In the present embodiment, the wheel speed sensor 1 corresponds to the rotational information detecting means, and the control unit 2 corresponds to the memory means, the calculation processing means, the first judging means and the second judging means.

Next, a description will be given of the calculation processing means, and the first and second judging means in accordance with the present invention, with respect to the case where a judged value (DEL value) is set to a ratio between a result obtained by subtracting a sum of signals from another pair of tire wheels on a diagonal line from a sum of signals from a pair of tire wheels on the diagonal line, and an average value of two sums.

Firstly, since the right and left driving wheels rotate at the same speed until the turn is performed so that the torque over a determined limited slip differential torque is generated, the DEL value calculated by the following formula (1) is in proportion to a difference between the right and left following wheels during the period.

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100 \quad (1)$$

In the formula (1), V(X) is a tire rotational speed (m/sec) and x is a tire in which 1 is a front left tire, 2 is a front right tire, 3 is a rear left tire and 4 is a rear right tire.

That is, since the limited slip differential torque is dependent upon the turning radius as far as the vehicle does not run on a specific road surface, there has been known that, in the case where a reciprocal number $1/R_0$ of a turning radius $R_0$ is calculated from the difference between the right and left following wheels in accordance with the following formula (2) and the DEL value is employed for the judging value of pressure decrease, the DEL value becomes the difference itself between the right and left following wheels during the period that the differential operation is limited, and the DEL value becomes substantially fixed when the limitation is released.

$$\frac{1}{R_0} = \frac{1}{T_W} \times \frac{V(1) - V(2)}{V_{AVE}} \qquad (2)$$

In this formula (2), $T_w$ is a tread width and $V_{AVE}$ is an average value of the right and left tires.

In this case, since the DEL value is severely changed by a speed of the vehicle, a driving force, a lateral acceleration (lateral G) or the like, it is preferable to reduce a dispersion of the DEL value so as to improve an accuracy by previously searching an influence in accordance with a vehicle tuning so as to apply correction, for example, with respect to a load movement at a time of turning, a change in the DEL value due to the driving force, or a sensitivity correction of the DEL due to the vehicle speed.

In the relation between the reciprocal number $1/R_0$ of the turning radius of the following wheel and the DEL value mentioned above, when the pressure of the driving wheel is decreased, a center turning radius to be differential limited is shifted, and when the pressure of the following wheel is decreased, the calculation of the turning radius itself is shifted, so that the DEL value moves in parallel in a vertical direction along a line (a diagonal line) of the difference between the right and left following wheels. Accordingly, it is necessary to judge the pressure decrease by comparing a horizontal portion of the normal pneumatic pressure condition with a horizontal portion of the decreased pressure condition. Thus, it is necessary to identify from where a horizontal portion starts in both conditions. However, since the horizontal portion is changed in accordance with material or size of a tire, property such as rigidity, a pressure decrease amount of the tire or the like, it is very hard to define the horizontal portion (region).

Then, in the same manner as that of the conventional art, the present invention performs the first judging step by using experimental results obtained by running the vehicle mounting the LSD thereon to which the tire (tire size 225/45R17) having a normal pneumatic pressure (220 Kpa) is attached, on a public road in German including Auto-bahn, and running the vehicle in which the pneumatic pressures of four tires attached to the LSD mounting vehicle are respectively and independently 40% decreased, in the same manner as that of the tire having the normal pneumatic pressure. That is, the reciprocal number 1/R of the turning radius R calculated from the driving wheels and the DEL value are respectively set to the horizontal axis and the vertical axis, the relation between the reciprocal number 1/R of the turning radius R and the DEL value is searched, and thereafter, the value 1/R is separated into the following three regions, then, the data is simply averaged.

Right Turn: 1/R<−0.02
Straight Run: −0.002≦1/R≦0.002
Left Turn: 1/R>0.002

Accordingly, since the horizontal portion can be easily determined, the comparison with the reference value (in this case, the average of the judged values near the straight run, at the left turn and at the right turn is calculated in the initializing run with the general internal pressure and this average is previously stored as the reference value at a time of initializing) at the normal pneumatic pressure, and the decrease in internal pressure is judged by comparing the DEL value with the reference value at every regions of the turning radius 1/R. When the dispersion of the data in the straight portion is much, the pressure decrease judgement can be performed by increasing a threshold for pressure decrease judgement.

Figure 3:
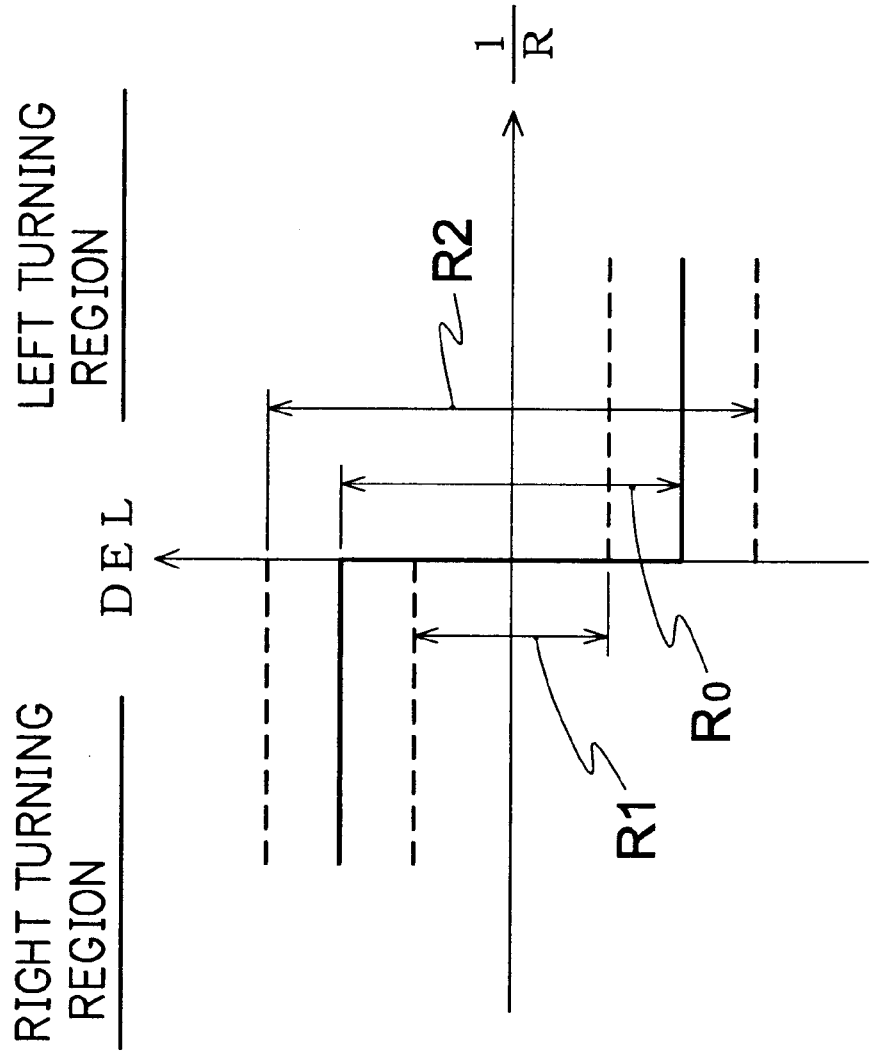
FIG. 3 is a view showing a relation between a judged value when a limited slip differential torque of a limited slip differential device (LSD) changes and a reference judged value.

Further, in accordance with the present invention, in the case where it is judged by the judging means that the pneumatic pressure is decreased, the difference R between the judged value in the right turning region and the judged value in the left turning region is compared with the difference (reference difference) $R_0$ between the reference judged value in the right turning region and the reference judged value in the left turning region which are obtained at a time of initializing run. When the values R and $R_0$ are substantially equal to each other, for example, when the value R is within a range $R_0 \pm 0.1$, the pressure of the tire is decreased. However, when the value R is smaller than the value $R_0$ such as a value R1 shown in FIG. 3, or the value R is largely different from the value $R_0$ such as a value R2, the difference between the judged value in the right turning region and the judged value in the let turning region is different from the reference difference by not less than 0.2, it is judged that the limited slip differential torque of the LSD is changed, so as to cancel the judgment of the decrease in internal pressure. Accordingly, it is possible to prevent the erroneous alarm from being issued so as to accurately judge the decrease in pneumatic pressure.

Figure 4:
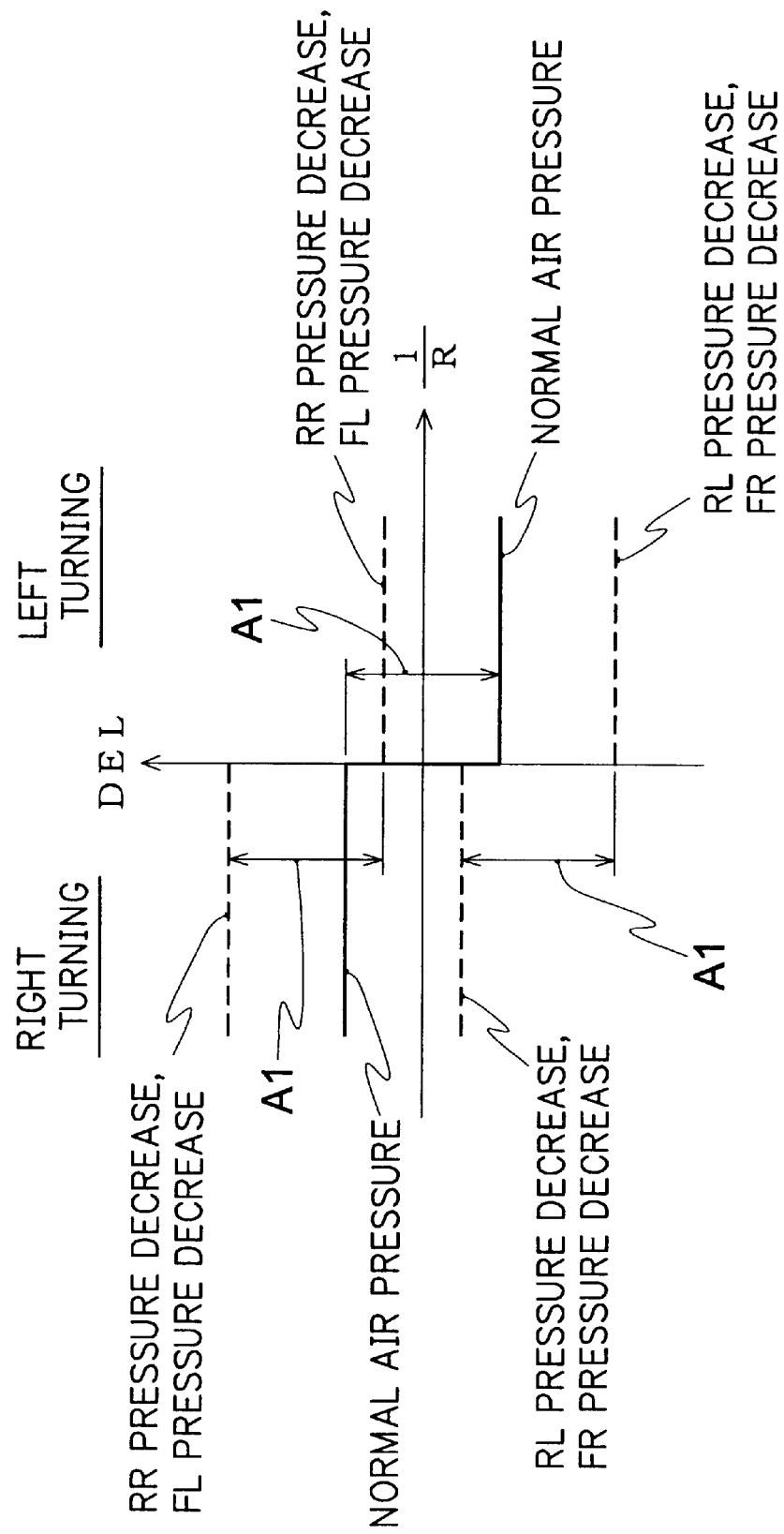
FIG. 4 is a view showing a relation between a judged value when internal pressure decreases and a reference judged value.
Figure 5:
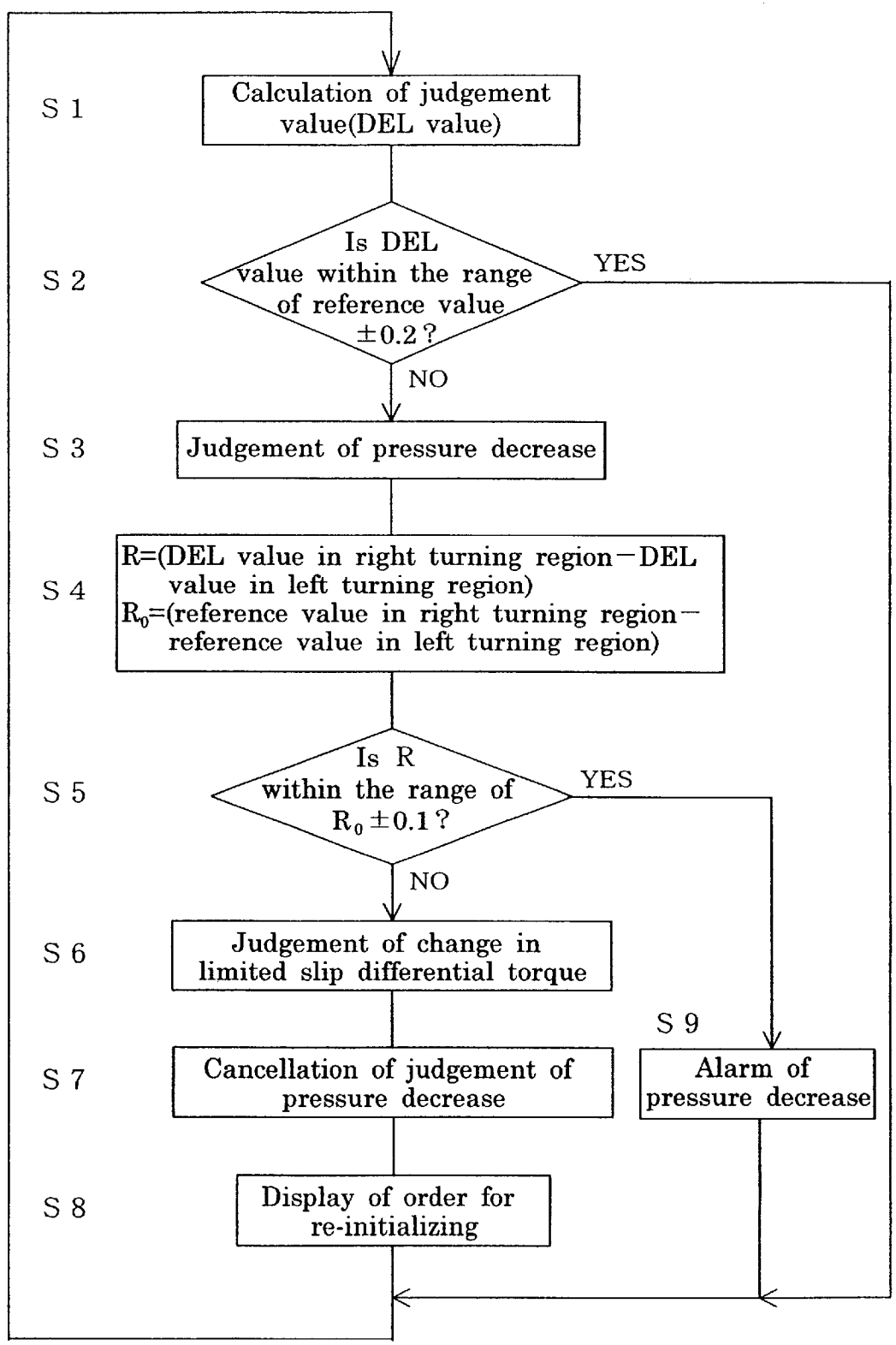
FIG. 5 is one embodiment of a flow chart in accordance with the present invention.

Here, in the case where the limited slip differential torque is not changed and only the pneumatic pressure of a tire is changed, a difference A1 between the judged value in the right turning region and the judged value in the left turning region becomes always constant even when the judged value is changed as shown in FIG. 4, so that the pressure decrease judgment is kept in this case.

In this case, it is known that the DEL value near the straight line in a winter tire becomes larger than the judged value (DEL value) near the straight line in a summer tire, and that the judged values in the left turning region and the right turning region are different from each other.

Therefore, in accordance with the present invention, since it is possible to determine that the winter tire is employed when the absolute values of the reference value at a time of turning right and left are both equal to or more than 0.1, and that the summer tire is employed in the other cases, the decrease in internal pressure is judged by comparing the judged value with the reference value at every regions of the turning radius on the basis of the relation between the reciprocal number of the turning radius and the judged value, after identifying whether the tire attached to the driving shaft is the summer tire or the winter tire. Next, when the difference between the judged value in the right turning region and the judged value in the left turning region is different from the reference difference, the second judging means cancel the judgement of the decrease in internal pressure and prevents the erroneous alarm from being issued. In this case, in order to identify whether the tire is the summer tire or the winter tire, it is preferable to provided with the identifying means determining on the basis of the relation between the reciprocal number of the turning radius and the judged value.

Next, a description will be given of the present invention on the basis of an example, however, the present invention is not limited only to the example.

EXAMPLE

Figure 6:
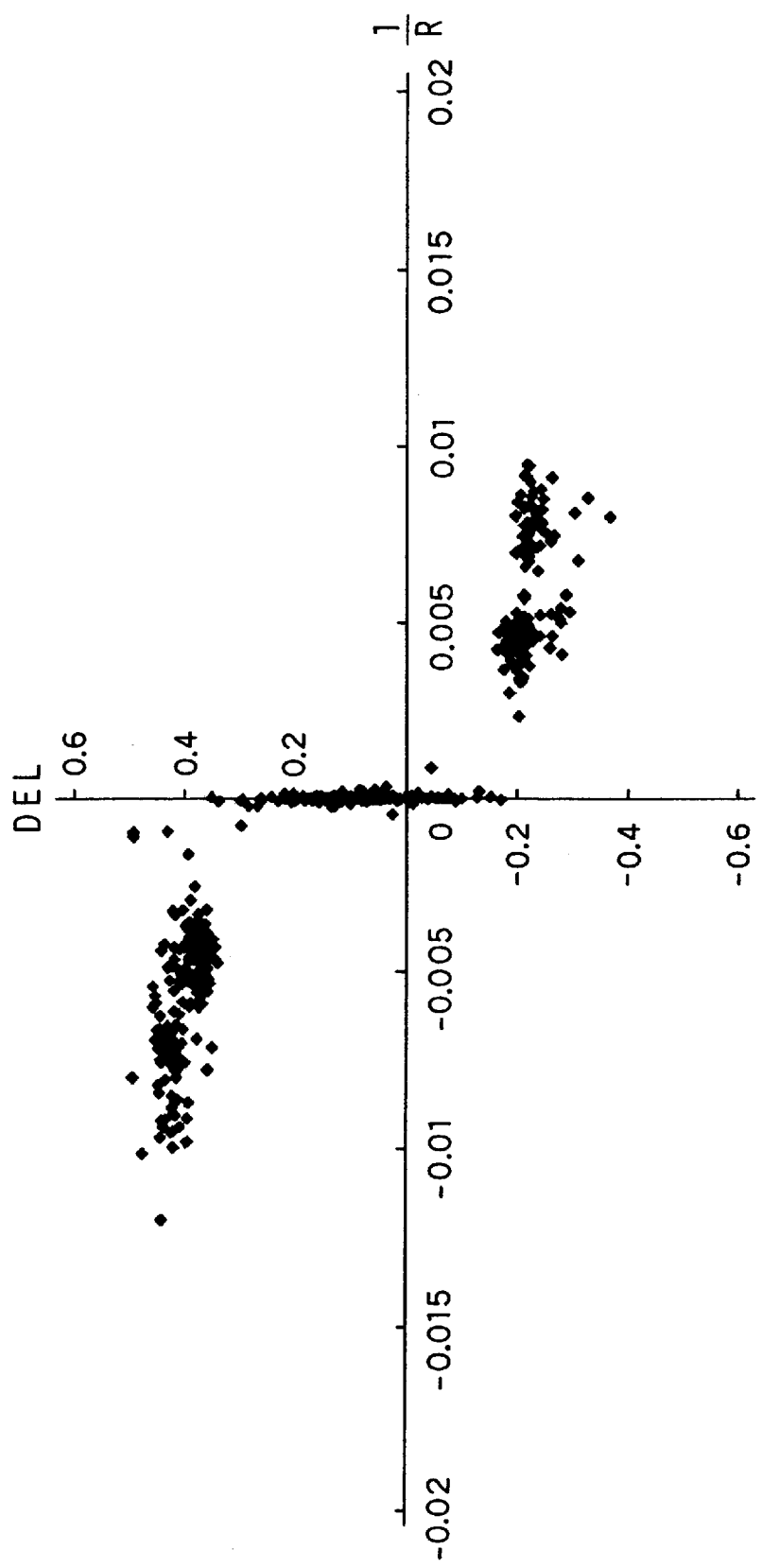
FIG. 6 is a view showing a relation between a DEL value and a reciprocal number of a turning radius calculated from a difference between right and left driving wheels when the limited slip differential torque is normal.

At first, a tire having a normal pneumatic pressure (220 Kpa) was attached to a vehicle on which a limited slip differential device was mounted, and the vehicle ran on a public road including a highway. A graph was obtained by respectively setting a reciprocal number 1/R of a turning radius calculated from driving wheels and a DEL value on the basis of data at this time to a horizontal axis and a vertical axis, as shown in FIG. 6. A limited slip differential torque at this time was 105 Nm. It is known from FIG. 6 that an average value of the DEL value at a time of the normal pneumatic pressure is about 0.4 at a time of right turning, about 0.1 at a time of straight running, and about −0.2 at a time of left turning (step S1). In this case, these values respectively become reference values in the respective cases.

Figure 7:
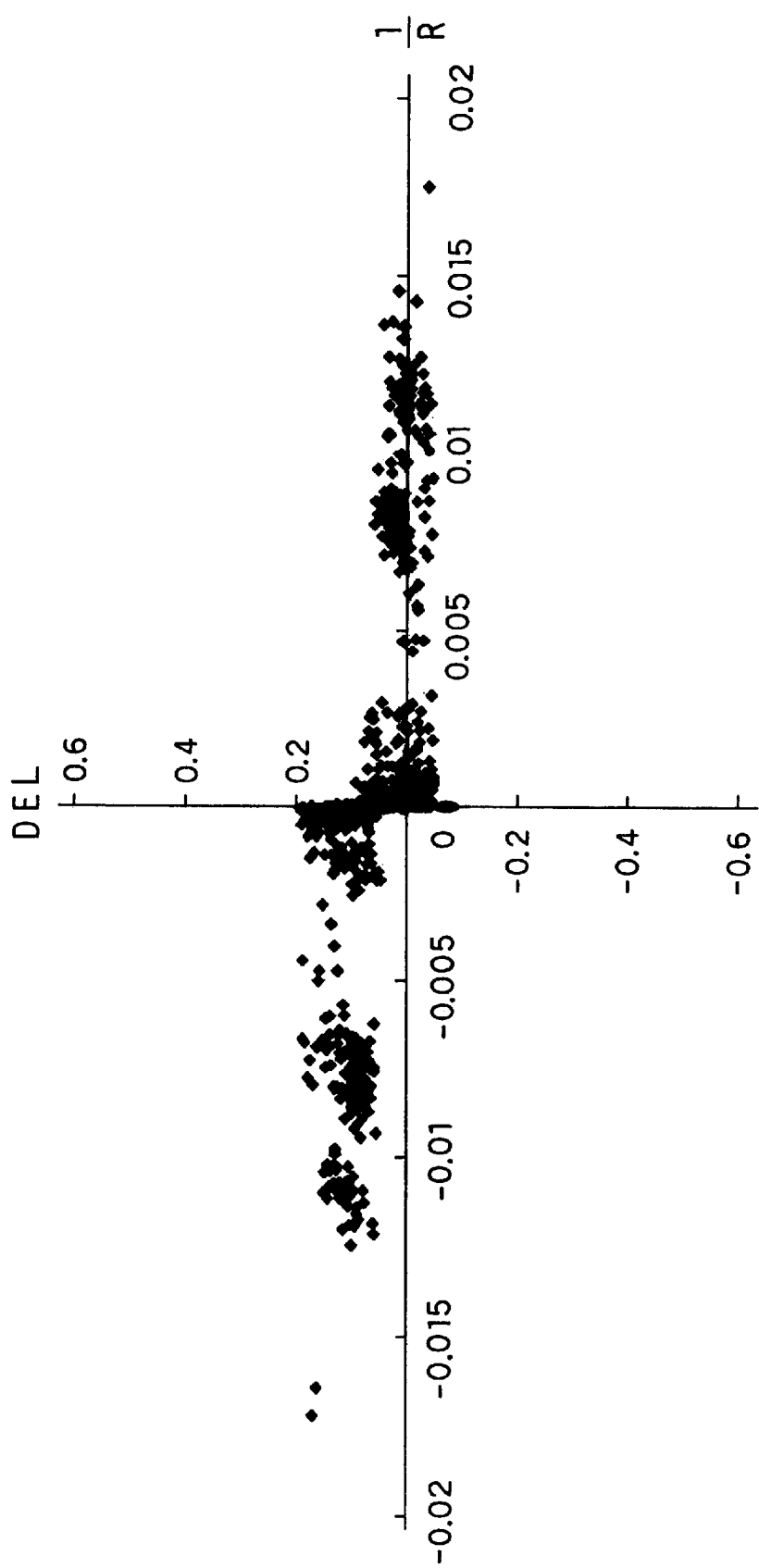
FIG. 7 is a view showing a relation between a DEL value and a reciprocal number of a turning radius calculated from a difference between right and left driving wheels when the limited slip differential torque is reduced.
Figure 8:
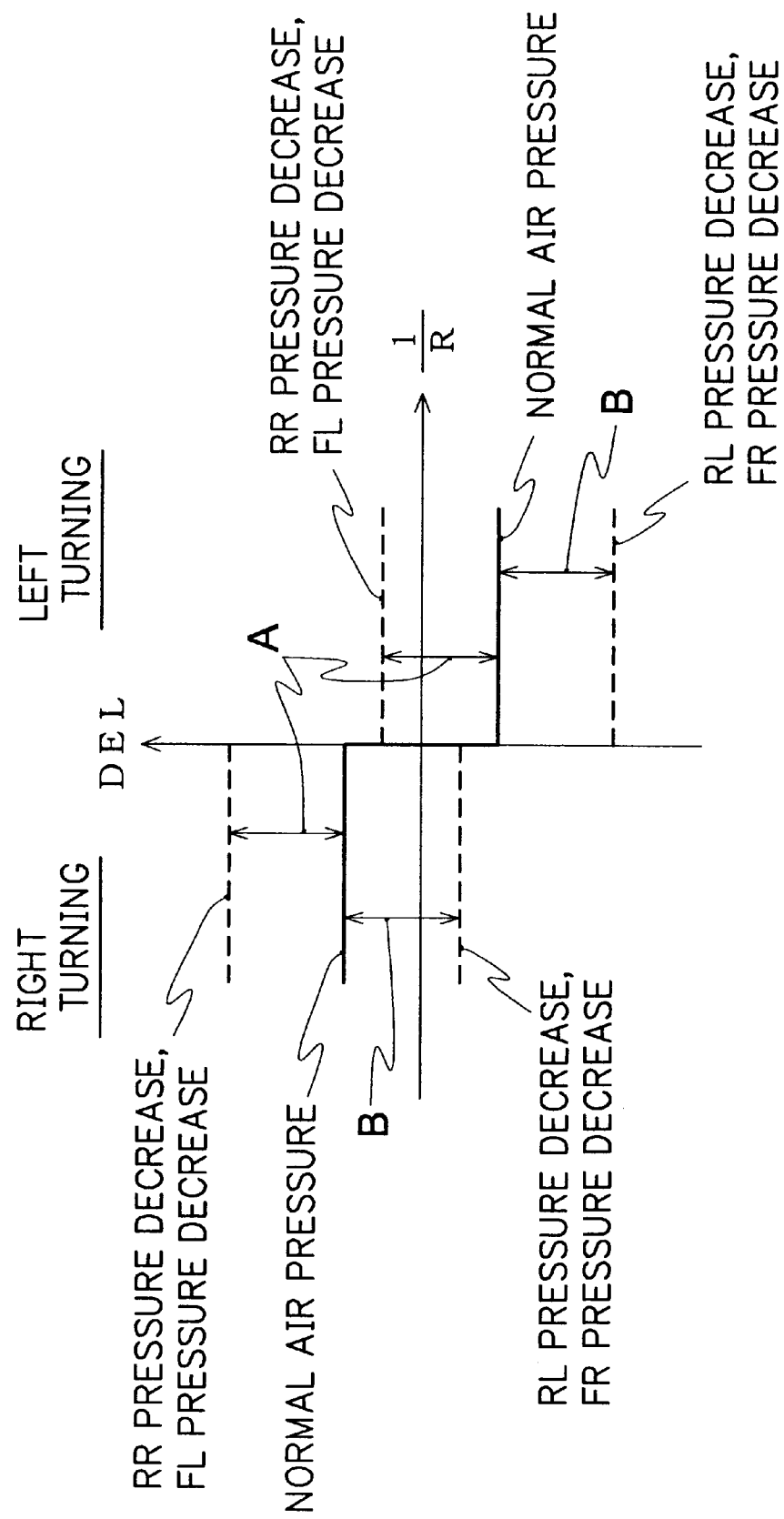
FIG. 8 is a schematic view showing a relation between a DEL value and a reciprocal number of a turning radius calculated from a difference between right and left driving wheels, in accordance with the conventional art.
Figure 9:
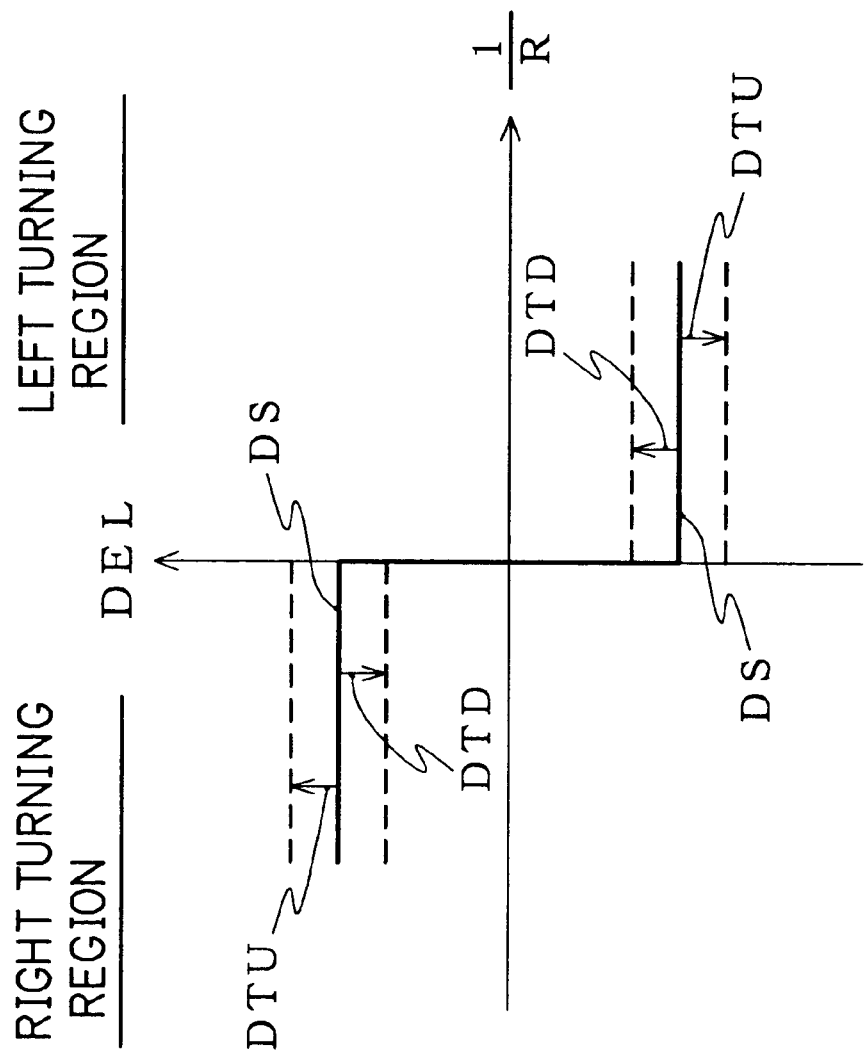
FIG. 9 is a schematic view showing change in DEL value at a time when the limited slip differential torque is increased or decreased.

Next, the running test in the same manner as that mentioned above was applied to the vehicle having the normal pneumatic pressure tire under a state that the limited slip differential torque was reduced to 6 Nm, and the data was collected. Further, as shown in FIG. 7, a graph between the reciprocal number 1/R of the turning radius and the DEL value is prepared (step S1). In this case, although the pneumatic pressure of the tire is normal, the DEL value in the right turning region is about 0.1 and is largely different from the reference value about 0.4 (step S2), so that it is judged to be a pressure decrease (step S3). However, when calculating a difference between the DEL value in the right turning region and the DEL value in the left turning region, the value becomes about 0.1 and is very small in comparison with the difference of about 0.6 between the reference value in the right turning region and the reference value in the left turning region (steps S4 and S5), so that the pressure decrease judgement is canceled by judging that the limited slip differential torque is reduced (steps S6 and S7). In this case, when the difference between the DEL value in the right turning region and the DEL value in the left turning region with the difference between the reference value in the right turning region and the reference value in the left turning region is very large, a pressure decrease alarm is issued (step S9).

Further, in the case where the state mentioned above is generated, it is possible to correct the reference value to a proper value by outputting an alarm (command) for promoting a re-initialization (step S8).

As mentioned above, according to the present invention, it is possible to properly judge the decrease in internal pressure of the tire in the vehicle mounting the LSD or the like thereon, thereby securely preventing the erroneous alarm from being issued.

What is claimed is:

1. An apparatus for alarming decrease in tire air-pressure which alarms decrease of internal pressure of a tire on the basis of a rotational information obtained by tires attached to a four-wheeled vehicle, comprising:

rotational information detecting means for detecting a rotational information of each of the tires;

memory means for storing the rotational information of each of the tires;

calculation processing means for calculating a reciprocal number of a turning radius from the rotational information of the tires attached to a driving shaft among the rotational information of the respective tires and calculating a judged value from the rotational information of the respective tires;

first judging means for comparing the judged value with a reference value at every regions of the turning radius on the basis of a relation between the reciprocal number of the turning radius and the judged valve so as to judge decrease in internal pressure; and second judging means for canceling a judgement of decrease of internal pressure when a difference between the judged value in the right turning region and the judged value in the left turning region is different from a difference between a reference judged value in the right turning region and a reference judged value in the left turning region which are obtained at a time of initializing run.

2. A method for alarming decrease in tire air-pressure which alarms decrease of internal pressure of a tire on the basis of a rotational information obtained by tires attached to a four-wheeled vehicle, comprising the steps of:

comparing a judged value with a reference value at every regions of a turning radius so as to judge decrease in internal pressure on the basis of a relation between a reciprocal number of the turning radius calculated from the rotational information of a tire attached to a driving shaft in the four-wheeled vehicle and a judged value calculated from the rotational information of the tires attached to the four-wheeled vehicle; and canceling a judgement of decrease in internal pressure when a difference between the judged value in the right turning region and the judged value in the left turning region is different from a difference between a reference judged value in the right turning region and a reference judged value in the left turning region which are obtained at a time of initializing run.

* * * * *